Oct. 2, 1956     O. H. LUDEMAN     2,765,142

VALVES

Filed May 17, 1954     3 Sheets-Sheet 1

INVENTOR.
OSCAR H. LUDEMAN
BY James G. Bethell
Attorney.

Oct. 2, 1956 — O. H. LUDEMAN — 2,765,142
VALVES
Filed May 17, 1954 — 3 Sheets-Sheet 2

INVENTOR.
OSCAR H. LUDEMAN
BY James G. Bethell
Attorney

Oct. 2, 1956     O. H. LUDEMAN     2,765,142
VALVES

Filed May 17, 1954     3 Sheets-Sheet 3

INVENTOR.
OSCAR H. LUDEMAN

United States Patent Office 2,765,142
Patented Oct. 2, 1956

2,765,142

VALVES

Oscar H. Ludeman, New York, N. Y.

Application May 17, 1954, Serial No. 430,090

2 Claims. (Cl. 251—162)

This invention relates to an improvement in valves, with particular reference to valves of the through-flow type, wherein the valve is provided with a passage for the flow therethrough of the fluid being handled.

My improved valve is suitable for handling steam, air, gas, or liquids.

In general, my improved valve comprises a valve casing which is equipped with an annular valve seat, coaxial with the center line of the valve casing. The valve itself, which has no bodily movement, is journaled for rotation in fixed bearings disposed abreast of each other in the valve casing or housing, these bearings being so disposed that, in rotating the valve to seat and unseat the same, the valve is constrained to move about a fixed axis extending or passing through the valve transversely thereof and eccentric to the longitudinal axis or center line of the ducts with which the valve casing is equipped and the longitudinal axes of the valve casing and the valve seat. Such construction precludes any dragging of the valve across the face of the valve seat, both on the seating and unseating movements of the valve. It will be appreciated furthermore that, because of the eccentricity above referred to, tight seating of the valve is promoted, with added rotative load by way of a handwheel or other instrumentality.

In addition to the foregoing, the valve seat of my improved valve is flexible, embodying a flexible metal that will accommodate itself automatically to slight variants due to high temperatures or other causes, thus ensuring tight seating due to the heavy unbalanced pressure against the valve when seated.

My improved valve is equipped with an integral by-pass of such construction that the necessity for outside piping is eliminated and manufacturing and maintenance costs reduced.

My invention also provides for automatically locking the valve actuating means as well as the valve itself in any and all positions.

In the accompanying drawings.

Figure 1:
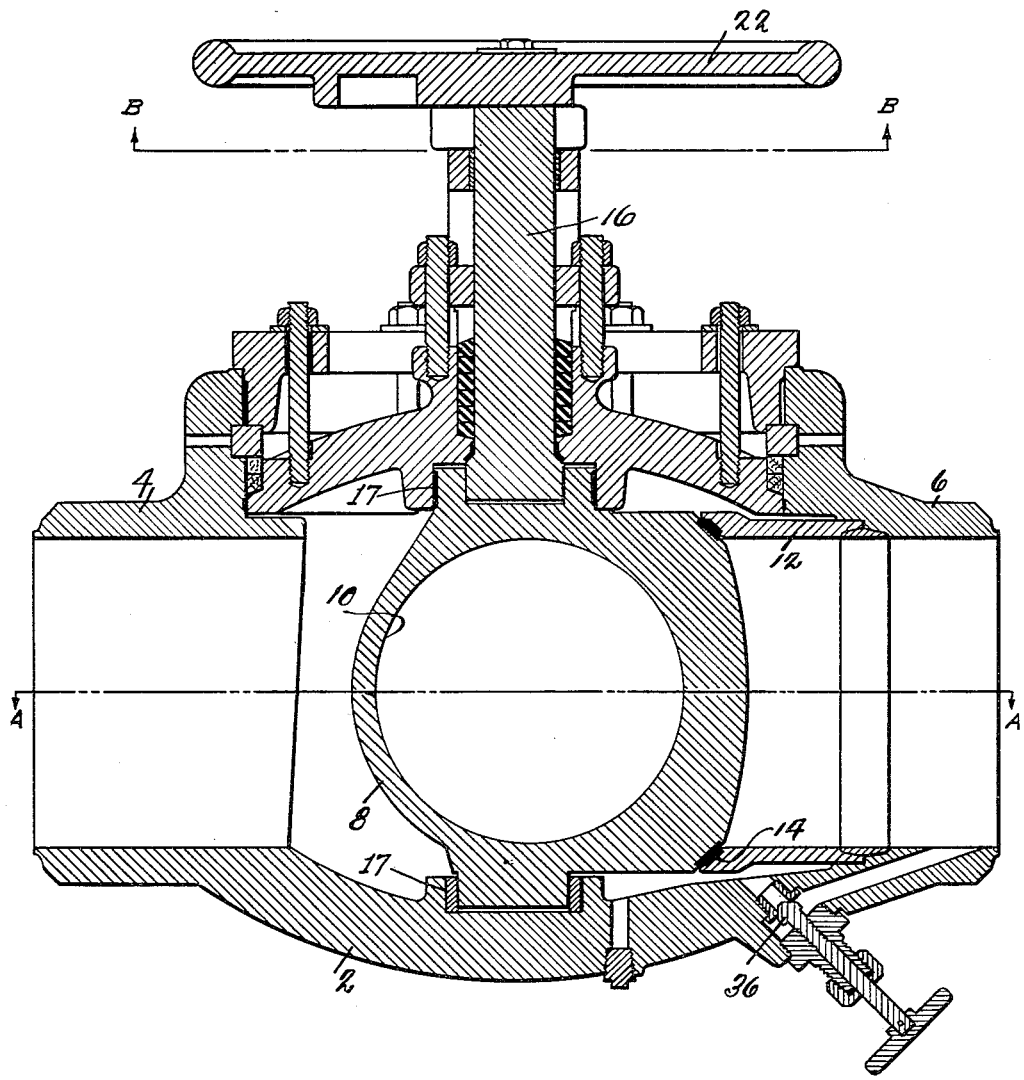
Fig. 1 is a sectional, elevational view of an embodiment of my invention with the valve shown in closed position.

Referring to the drawings in detail and, first of all, to Figs. 1 to 4, both inclusive, of the drawings.

2 designates a valve casing, provided at its ends with ducts 4 and 6, the casing and ducts being coaxial. Within the casing I provide a rotatable valve 8 of the through-flow type, the valve being provided with a through passage 10, which, when the valve is rotated to full-open position, is in alignment with the ducts 4 and 6, to provide for unobstructed flow through the valve casing of the fluid being handled. The valve is journaled in fixed bearings 17, disposed abreast of each other in the valve casing. 12 designates a valve seat for the valve 8. This seat is in the form of an annulus or ring within the valve casing, disposed about the inner end of one of the ducts concentric with the duct. The active end of the seat, that is, the end which is contacted by the valve in seating the valve, has been shown as conical and faced with a hard material designated 14, such as Stellite. On low-temperature installations other materials may be employed for this purpose, such as brass, for example. At this point I wish to state that, while I have shown the active face of the valve seat as a plane surface, it may be concaved or convex, this feature being referred to again hereinafter.

The valve 8 is rotated to close and open the same by means of valve stem 16. This stem is permanently secured to the valve in such position that the axis or center line of the stem passes through the axis or center line of the bearings 17. As will be seen from Figs. 1, 2, and 3, the fixed bearings are so disposed relatively to each other that, upon rotation of the valve stem to close and open the valve, the valve is constrained to move about a fixed axis extending through the valve transversely of the valve passageway and eccentric to the axes of the ducts, valve casing, and valve seat. The active face of the valve may be faced with Stellite, for example, for high-temperature fluids or with any other suitable material, as shown at 20.

As above noted, 14 has a flat plane surface, and the facing for the valve 4 may also have a flat plane surface. Under such conditions the valve, when closed, will contact the valve seat the full width of the seat. In the drawings I have shown the valve facing slightly curved, and in such case, as will be appreciated, the valve will make line contact only with its seat. These conditions may be reversed: a curved seat and plane valve face, as will be understood. In other words, it is to be understood that it is immaterial to my construction whether or not the seat is curved and the valve plane, the seat plane and valve curved, both valve and seat plane, or both valve and seat curved.

Regardless of the features just referred to, it will be appreciated that, because of the relative positioning of the fixed bearings 17, the first motion of the valve, when moving the valve toward open position, is an unseating of the valve. No dragging of the valve across the seat. This holds true on the opposite movement of the valve, viz., when closing.

Figure 2:
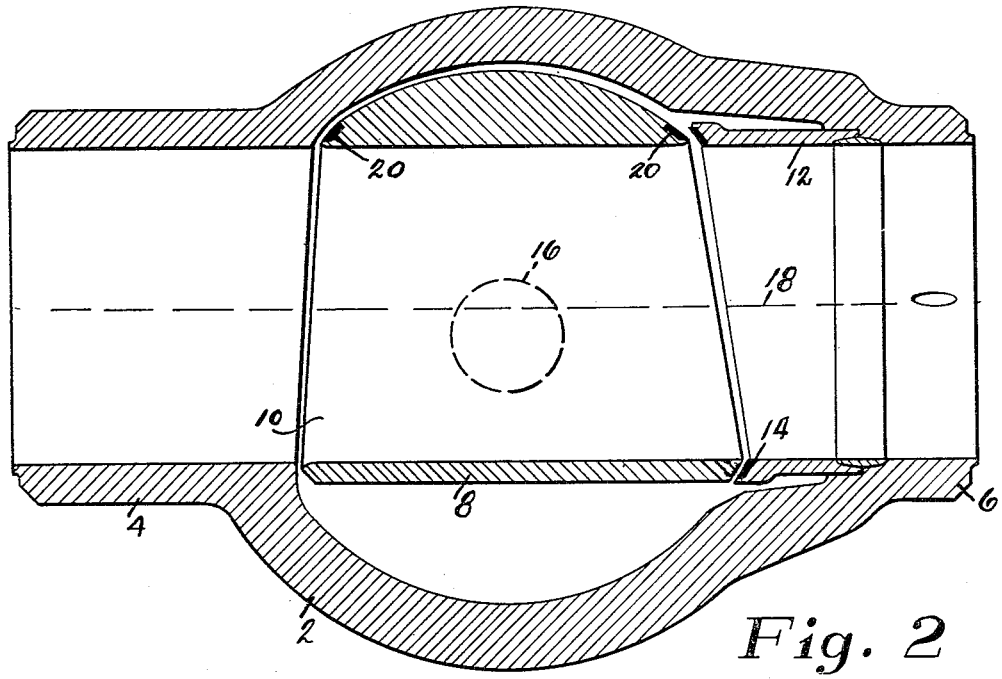
Fig. 2 is a plan section through Fig. 1 substantially on the line A—A but showing the valve in open position.
Figure 3:
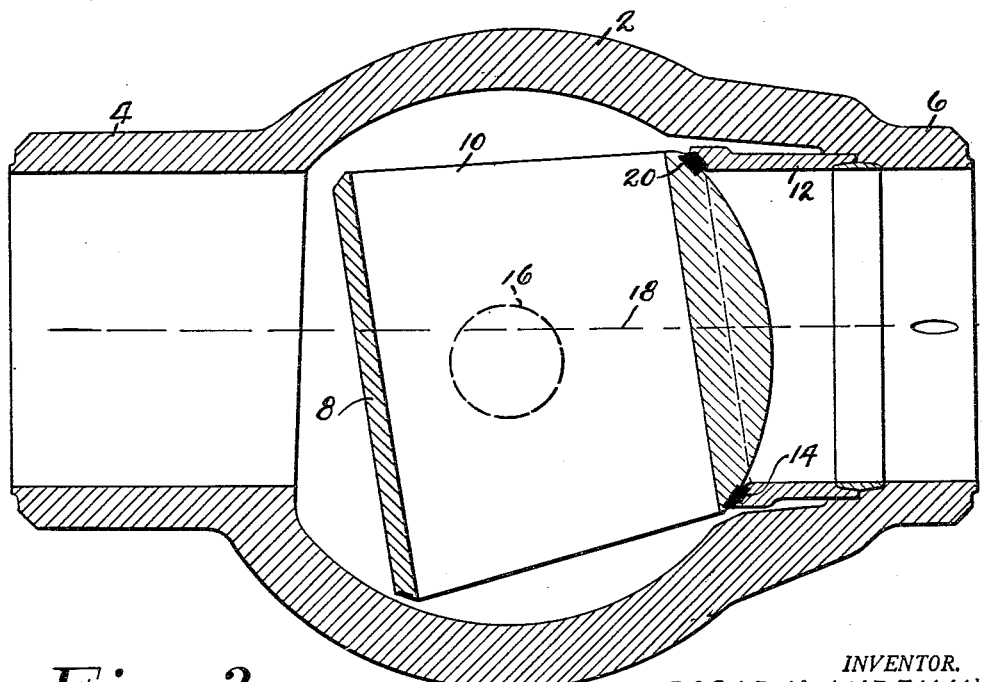
Fig. 3 is a plan section through Fig. 1 substantially on the line A—A, looking in the direction of the arrows thereon and showing the valve in closed position.

As will be seen from Fig. 2, when the valve is in full-open position, the passageway 10 through the valve is in exact alignment with the ducts 4 and 6, so that there is provided a free and unobstructed flow of fluid through the casing for its entire length.

Figure 4:
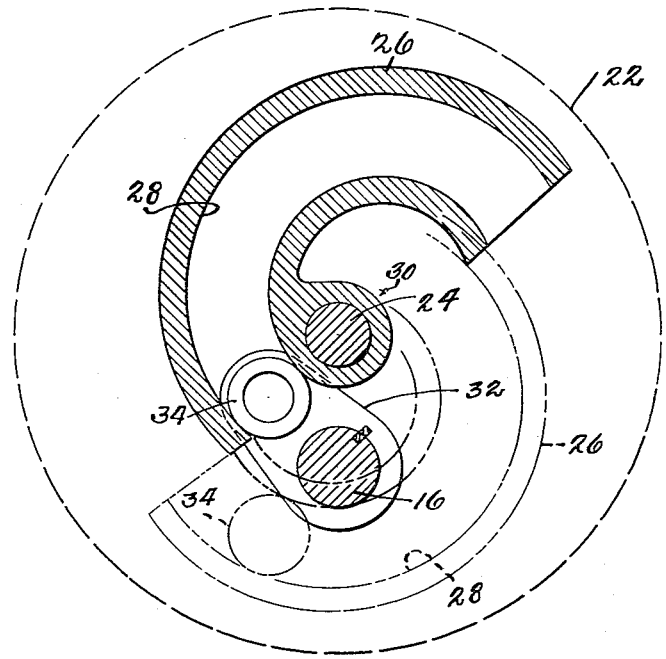
Fig. 4 is a section on the line B—B of Fig. 1, looking in the direction of the arrows thereon, showing the locking mechanism for the handwheel and valve.

The valve stem 16 is rotated by means of a handwheel 22 through the medium of novel driving and locking mechanism clearly illustrated in Fig. 4 of the drawings. Upon an inspection of this view, it will be seen that the handwheel is mounted for rotation on a stud 24, which may be mounted in any convenient fashion on the top or side of the valve casing 2. Integral with the underside of the handwheel is a cam 26, providing curved cam track 28. The center of the curves providing the track 28 is at 30, as illustrated; that is, eccentric to or offset from the center of the stud 24, about which the handwheel rotates. Keyed or otherwise rigidly affixed to the valve stem 16 is a short crank arm 32, which carries a cam-follower roller 34, always riding in the ecentric cam track 28. It will be very apparent, therefore, that, whenever the valve 4 is to be rotated, rotation of the handwheel 22 in the appropriate direction will cause deflection of the crank arm 32 and, hence, rotation of the valve. Because of the drive described between the handwheel and valve stem, it will be seen that the valve stem is locked in all adjusted positions of the valve, so far as any tendency of the valve to rotate due to pressure applied to the valve is concerned.

36 designates a by-pass valve which, it will be seen, is built into the valve casing 2 and requires no outside pipe connections or other equipment. On high-pressure installations it may be desirable, when starting operations first, to by-pass a small quantity of the high-pressure fluid being handled instead of attempting to "crack" the main valve 4. This is the function of the by-pass 36.

Figure 5:
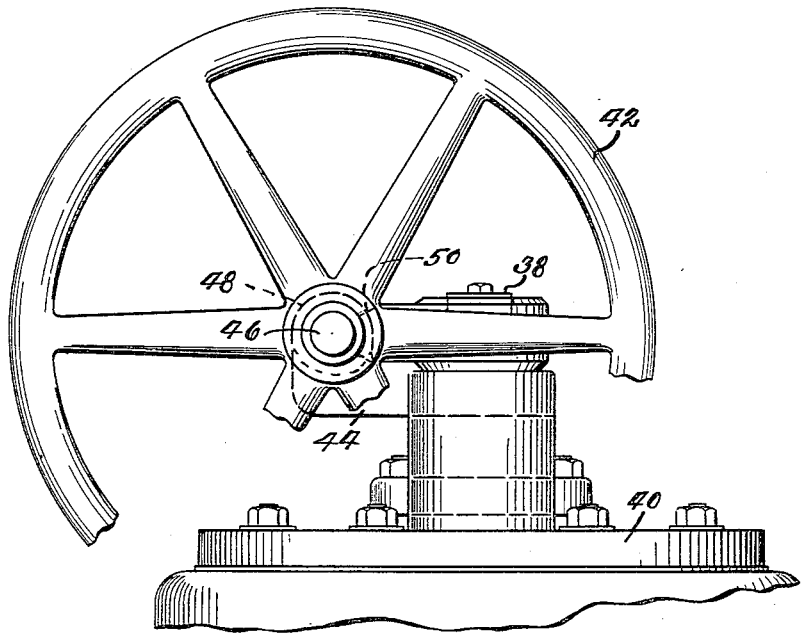
Fig. 5 is a modification of the locking mechanism shown in Fig. 4.

In Fig. 5 I have illustrated another form of construction for actuating and locking the valve stem. In this embodiment the valve stem is designated 38, while the valve casing is designated 40. The handwheel 42 stands vertically, as distinguished from the showing in Fig. 1, and may be supported on a bracket 44, secured to the side of the valve casing. The hub 46 of the handwheel is provided with a worm gear 48, meshing with rack 50, which is mounted on the valve stem 38.

What I claim is:

1. Valve mechanism comprising, in combination, a valve casing; an inlet duct and an outlet duct for the casing, said casing and ducts being coaxial; a valve seat which is disposed about the inner end of one of said ducts and is coaxial therewith; fixed bearings disposed opposite to each other in the wall of said casing; a rotatable valve for said valve seat journalled against bodily movement in said fixed bearings, said valve being provided with a passageway for the passage of fluid therethrough, said passageway extending transversely to the axis of rotation of the valve; and valve-operating means for rotating said valve in said fixed bearings to seat and unseat the valve, said bearings being so disposed relatively to the axes of said ducts, casing, valve seat, and valve passageway that, in rotating the valve to seat and unseat the same, the valve must move only about a fixed axis which is transverse of said valve passageway and eccentric to the longitudinal axes of the said ducts, valve casing, valve seat, and valve passageway, to provide for an unobstructed flow of fluid through the ducts, casing, and valve when the valve is in fully opened position.

2. Valve mechanism comprising, in combination, a valve casing; an inlet duct and an outlet duct for the casing, said casing and ducts being coaxial; a valve seat disposed about the inner end of one of said ducts concentric with the duct; fixed bearings disposed opposite to each other in the wall of said valve casing; a rotatable valve for said valve seat journalled against bodily movement in said fixed bearings, said valve being provided with a passageway for the passage of fluid therethrough, said passageway extending transversely of the axis of rotation of the valve; valve-operating means for rotating said valve in said fixed bearings to seat and unseat the valve, said bearings being so disposed relatively to the axes of said ducts, valve casing, valve seat, and valve passageway that, in rotating the valve to seat and unseat the same, the valve must move about a fixed axis which is transverse of said valve passageway and eccentric to the longitudinal axes of the said ducts, valve casing, valve seat, and valve passageway, to provide an unobstructed flow of fluid through the ducts, valve casing, and valve when the valve is fully opened; and a by-pass valve built into the said valve casing for the selective by-passing of fluid past the first-mentioned valve with the latter in closed position.

References Cited in the file of this patent

UNITED STATES PATENTS

| | | |
|---|---|---|
| 596,000 | Heston | Dec. 21, 1897 |
| 1,128,228 | Collar | Feb. 9, 1915 |
| 1,656,183 | Enz | Jan. 17, 1928 |
| 2,076,839 | Heggem | Apr. 13, 1937 |
| 2,092,452 | Gilbert | Sept. 7, 1937 |
| 2,577,725 | Drake | Dec. 11, 1951 |
| 2,587,569 | Giauque | Feb. 26, 1952 |
| 2,655,942 | Dougherty | Oct. 20, 1953 |
| 2,663,538 | Bacchi | Dec. 22, 1953 |

FOREIGN PATENTS

| | | |
|---|---|---|
| 599,176 | France | of 1925 |
| 248,968 | Italy | of 1926 |
| 335,462 | Great Britain | of 1930 |
| 785,155 | France | Oct. 21, 1935 |
| 540,067 | Great Britain | Oct. 3, 1941 |
| 561,587 | Great Britain | of 1944 |